United States Patent
Ling et al.

(10) Patent No.: US 10,950,071 B2
(45) Date of Patent: Mar. 16, 2021

(54) METHOD FOR PREDICTING THE LIFE EXPECTANCY OF A COMPONENT OF AN OBSERVED VEHICLE AND PROCESSING UNIT

(71) Applicant: SIEMENS MOBILITY GMBH, Munich (DE)

(72) Inventors: Jennifer Ling, Munich (DE); Maria Davidich, Munich (DE)

(73) Assignee: Siemens Mobility GmbH, Munich (DE)

(*) Notice: Subject to any disclaimer, the term of this patent is extended or adjusted under 35 U.S.C. 154(b) by 0 days.

(21) Appl. No.: 16/478,569

(22) PCT Filed: Jan. 17, 2017

(86) PCT No.: PCT/EP2017/050870
§ 371 (c)(1),
(2) Date: Jul. 17, 2019

(87) PCT Pub. No.: WO2018/133919
PCT Pub. Date: Jul. 26, 2018

(65) Prior Publication Data
US 2019/0347875 A1 Nov. 14, 2019

(51) Int. Cl.
*G07C 5/08* (2006.01)
*G06F 16/2455* (2019.01)
(Continued)

(52) U.S. Cl.
CPC ......... *G07C 5/085* (2013.01); *G06F 16/2455* (2019.01); *G06F 16/2465* (2019.01); *G06N 5/04* (2013.01)

(58) Field of Classification Search
CPC .... G07C 5/006; G07C 5/0808; G07C 5/0816; B60R 2021/01122; B60R 2021/01129;
(Continued)

(56) References Cited

U.S. PATENT DOCUMENTS 7,024,335 B1* 4/2006 Parlos ................ G05B 23/0254
700/30
9,477,222 B2* 10/2016 Schramm ........... G05B 23/0283
(Continued)

FOREIGN PATENT DOCUMENTS

DE 102010049909 A1 5/2012
JP 2006300712 A 11/2006
(Continued)

OTHER PUBLICATIONS

McGill Centre for Intelligent Machines, Diagnostic Trouble Code (DTC) Charts and Descriptions, 2007, PCED On Board Diagnostics, http://www.cim.mcgill.ca/~cprahacs/gtcs/DTC_Codes.pdf (Year: 2007).*
(Continued)

*Primary Examiner* — Thomas G Black
*Assistant Examiner* — Sara J Lewandroski
(74) *Attorney, Agent, or Firm* — Laurence Greenberg; Werner Stemer; Ralph Locher

(57) ABSTRACT

The life expectancy of a component of a vehicle that is being observed is predicted. A processing unit is fed with status data of components of selected vehicles. Moreover, the processing unit is fed with an operating parameter for each of the components of the selected vehicles. The operating parameter influences the status data of the respective component. The processing unit determines a function between the operating parameter and the status data for each of the selected components. One function, which fits best for the component of the observed vehicle, is selected by an algorithm. The processing unit is fed with an operating parameter of the component of the observed vehicle. The processing unit predicts the life expectancy of the component of the observed vehicle using the selected function and the operating parameter of the component of the observed vehicle.

15 Claims, 1 Drawing Sheet

(51) Int. Cl.
*G06F 16/2458* (2019.01)
*G06N 5/04* (2006.01)

(58) Field of Classification Search
CPC ........ B60R 2021/01184; B60W 50/02; B60W 50/0205; B60W 2050/021; B60W 2050/0215; B60W 2050/022; B61L 15/0081; B61L 27/0083; B61L 27/0094; B60C 23/0481; B60G 2800/80; B60G 2800/802; B60H 1/00978; B60T 2270/406; B60T 2270/408; B60T 2270/413; B63B 79/30
See application file for complete search history.

(56) References Cited

U.S. PATENT DOCUMENTS

| | | | | |
|---|---|---|---|---|
| 9,507,342 | B2* | 11/2016 | De Prosperis | G05B 23/0283 |
| 2006/0058932 | A1* | 3/2006 | Garg | B60K 6/32 |
| | | | | 701/32.8 |
| 2008/0062115 | A1* | 3/2008 | Brown | G09G 3/3406 |
| | | | | 345/102 |
| 2010/0318246 | A1* | 12/2010 | Bieker | G05B 23/0283 |
| | | | | 701/19 |
| 2011/0046842 | A1* | 2/2011 | Smith | G07C 5/008 |
| | | | | 701/31.4 |
| 2016/0358477 | A1* | 12/2016 | Ansari | G06Q 30/0251 |
| 2018/0126972 | A1* | 5/2018 | Bozsik | B60T 17/004 |
| 2018/0286142 | A1* | 10/2018 | Pakki | B64D 45/00 |
| 2018/0288586 | A1* | 10/2018 | Tran | G06K 9/00671 |
| 2019/0213605 | A1* | 7/2019 | Patel | G06N 5/048 |

FOREIGN PATENT DOCUMENTS

| | | |
|---|---|---|
| RU | 2453929 C2 | 6/2012 |
| WO | 2013014202 A1 | 1/2013 |
| WO | 2014147830 A1 | 9/2014 |

OTHER PUBLICATIONS

Innova, Digital OBD2 Code Reader Owner's Manual, 2013, Innova, https://csr.innova.com/Content/Manual/Innova/Manual_3020a_E.pdf (Year: 2013).*

* cited by examiner

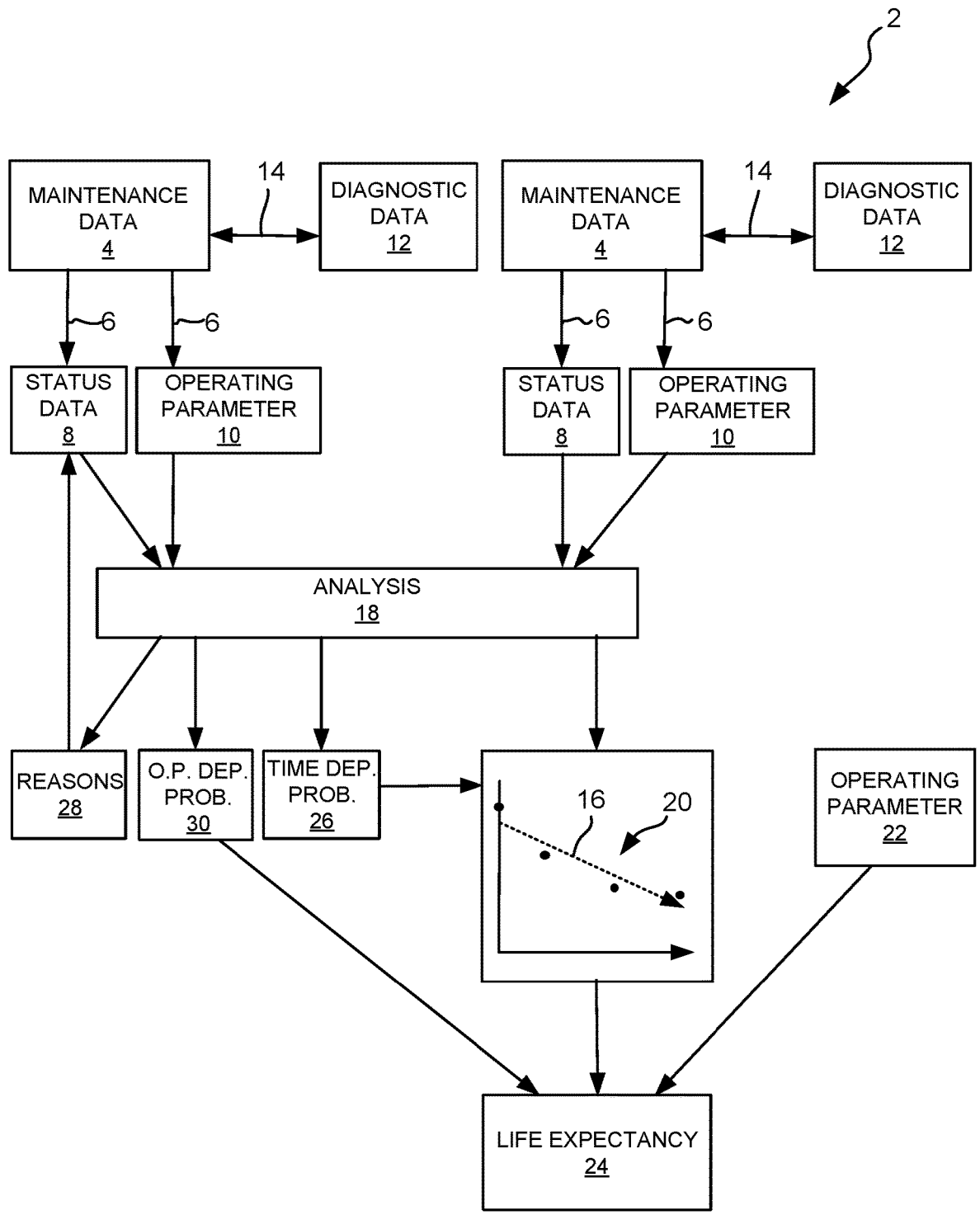

METHOD FOR PREDICTING THE LIFE EXPECTANCY OF A COMPONENT OF AN OBSERVED VEHICLE AND PROCESSING UNIT

BACKGROUND OF THE INVENTION

Field of the Invention

The invention relates to a method for predicting the life expectancy of a component of an observed vehicle.

Most components of a vehicle have a limited life expectancy. The vehicle is inspected regularly to check and/or identify the components, which have to be maintained or exchanged.

SUMMARY OF THE INVENTION

One objective of the invention is to provide a method for predicting the life expectancy of a component.

This objective is accomplished by means of a method according to claim 1 as claimed. In the method for predicting the life expectancy of a component of an observed vehicle, according to the invention, a processing unit is fed with status data of selected components of several vehicles. Moreover, the processing unit is fed with an operating parameter for each of these selected components of the several vehicles, which operating parameter influences the status data of the respective selected component. According to the invention, a function between the operating parameter and the status data is determined for each of the selected components. Moreover, one function, which fits best for the component of the observed vehicle, is selected by means of an algorithm. The selected function may be one of the determined functions Further, the processing unit is fed with an operating parameter of the component of the observed vehicle. Additionally, the life expectancy of the component of the observed vehicle is predicted by the processing unit using the selected function and the operating parameter of the component of the observed vehicle.

The invention is based on the consideration that often, particularly in public transport, one workshop is responsible for inspecting always the same vehicles. Normally, the workshop comprises a depot for storing spare parts. However, the storage space is limited. Hence, just a limited amount of spare parts can be stored. Additionally, it is economically more effective to have as little spare parts as possible, but as many as required.

By means of the invention, the life expectancy of the component of the observed vehicle can be predicted. In the same way, the life expectancy of the selected components of the several vehicles can be predicted. In this way, a number of needed spare parts can be determined by means of the invention. Preferably, the spare parts are of the same type as the component(s). Moreover, a service fluid for a component may also be considered as spare part.

Further, the invention is based on the finding that automatic prediction based on machine learning needs a lot of data and, hence, is complex. The vehicles used on track often do not provide real time measurements of the component, whose life expectancy shall be predicted. Hence, the invention is based on the idea to use the status data and the operating parameter, which expediently are determined anyway. In this way, a cheap and easy method for predicting the life expectancy can be provided.

The observed vehicle may be a vehicle for public transport. Preferably, the observed vehicle is a railway vehicle, particularly a train. Further, the observed vehicle may be a bus. Moreover, the observed vehicle may be a tram. Further, the observed vehicle may be a car, for example, a taxi or another car. Principally, the observed vehicle can be any vehicle.

Expediently, the several vehicles are of the same type as the observed vehicle. Preferentially, the several vehicles include the observed vehicle. Alternatively, the observed vehicle may be separate to the several vehicles.

The component of the observed vehicle may be a wheel. Further, the component of the observed vehicle may be e. g. an electric door, a climate control unit, a power transformer, a brake, a motor, or another component of the observed vehicle.

Expediently, the selected components of the several vehicles are of the same type as the component of the observed vehicle. In other words, the selected components of the several vehicles may be identical to the component of the observed vehicle. For instance, if the component of the observed vehicle may be a wheel, then the selected components of the several vehicles may also be wheels.

The operating parameter may be an operating parameter of the respective vehicle, of the respective component, and/or of a part influencing the status data of the respective component.

Advantageously, the operating parameter is a mileage. Further, it is preferred that the operating parameter is an operating time. Moreover, the operating parameter may be an operating number, also number of operations. Further, the operating parameter may be an operating power, particularly a sum of previously applied operating power. The operating parameter can be a combination of several of the above mentioned operating parameters.

Expediently, the status data represent the status of the respective component.

It is preferred, that the status data are past status data, particularly reporting the past status of the respective component. Further, the status data may be current status data, particularly reporting the current status of the respective component. In an advantageous embodiment of the invention, the status data are past status data and current status data.

Preferentially, the status data represent wear of the respective component. Particularly, the status data may represent and/or report abrasion, fouling, de-alignment, and/or contamination of the respective component. For example, the status data may comprise a measured dimension of the respective component reporting the abrasion.

Advantageously, the status data comprise information regarding inspection(s) of the respective component. Further, it is preferred that the status data comprise information regarding maintenance(s) of the respective component. Moreover, it is preferred that the status data comprise information regarding exchange(s) of the respective component. Further, the status data may comprise information regarding the status of the respective component. The information regarding the respective component may report wear of the component.

Particularly, the status data may comprise a time of the inspection(s), a time of the maintenance(s), and/or a time of the exchange(s). Further, the status data may comprise a type of maintenance. A maintenance may be a repair and/or a service of the respective component. For example, the maintenance may be a re-profiling, an exchange of a service fluid, a cleaning, a re-calibration, and/or another maintenance.

The information (of the status data) may be selected from maintenance data of the respective vehicle. However, the maintenance data may not have been created under the aspect of using it for any analysis. The status data may be determined in that component relevant information may be selected from the maintenance data.

The maintenance data may comprise text, e. g. flow text. The text of the maintenance data may be raw and/or unstructured.

Moreover, the maintenance data may comprise at least one value, particularly at least one measured value, for example a mileage of the respective vehicle, a diameter of the respective component and/or similar. The last mentioned value may be part of the text and/or separate to the text.

Preferentially, the information is selected from the maintenance data by means of text analysis. It is advantageous, that the information is selected from the maintenance data by means of text mining. The text mining may use information retrieval, e. g. Boolean retrieval, or another information extraction method.

Preferably, the text of the maintenance data is structured by means of the text analysis, particularly by means of the text mining. The text mining, particularly the structuring, may comprise the step of tokenisation, wherein the text may be broken into words and/or phrases. Moreover, the text mining, particularly the structuring, may comprise the step of normalisation, wherein misspelling may be corrected and/or abbreviations may be written out. Moreover, the text mining, particularly the structuring, may comprise the step of lemmatisation, wherein words are written in their lemmata/dictionary form.

Particularly on the basis of the structured text, a keyword dictionary may be created, particularly by means of the text analysis. The keyword dictionary may comprise component relevant entries. The keyword dictionary may comprise translations of the entries into different languages and/or synonyms.

The maintenance data may comprise several datasets. Datasets regarding the component may be selected by means of the keyword dictionary. Moreover, also datasets regarding infrastructure influencing the component can be selected by means of the keyword dictionary. Further, status data may be determined by analysing dataset entries of the selected datasets.

For instance, component relevant information may be selected by means of the text analysis/text mining, particularly by means of the keyword dictionary.

The text of the maintenance data may be searched for keywords of the keyword dictionary, particularly by means of the text analysis. Further, it is advantageous that by means of the text analysis information of the text, which refers to the respective component, is found.

The information of the text, which refers to the respective component, may comprise a status describing word and/or number.

Moreover, the operating parameter may be determined by means of the text analysis of the maintenance data, particularly by means of the text mining of the maintenance data. Further, the information, which refers to the respective component, can also be the operating parameter, particularly a value of the operating parameter.

In principal, the operating parameter of the components of the respective vehicles may be determined on the basis of the maintenance data and/or on the basis of driving-related diagnostic data of the respective vehicles, or by a combination of both, particularly by data merging between the maintenance data and the driving-related diagnostic data of the respective vehicles.

The function between the operating parameter and the status data is determined for each of the selected components. In other words, for each of the selected components one function is determined, which describes the relationship between the operating parameter and the status data. Each of the functions may be a regression function, for example a linear regression function. Each of the determined functions may have a slope. The slope of one of the functions may be constant and/or may be an averaged slope.

Preferentially, one slope, which fits best for the component of the observed vehicle, is selected by means of an algorithm. The selected slope may be one of the slopes of the determined functions. Particularly, the selected function may have the selected slope.

For selecting the slope, from the slopes of the determined functions a most frequent slope, a(n) (arithmetic) mean slope and/or a median slope may be determined. The selected slope may be the most frequent slope, the (arithmetic) mean slope or the median slope.

The life expectancy of the component of the observed vehicle may be predicted by means of the selected slope, particularly by using the operating parameter of the component of the observed vehicle.

The predicted life expectancy may be a mean life expectancy or a median life expectancy or similar.

A number of maintenances and/or exchanges of the (selected) components may be time-dependent. It can be determined, if the number of maintenances and/or exchanges within a given time interval is time-dependent. When the number of maintenances and/or exchanges within the given time interval is time-dependent, the determined function (between the operating parameter and the status data) may be time-dependent within the given time interval. For example, the function may be determined separately for several periods within the given time interval. Further, the determined function may be different for several periods within the given time interval.

In this way, the time-dependency of the number of maintenances and/or exchanges of the (selected) components may be taken into account for predicting the life expectance of the component of the observed vehicle.

For instance, the number of maintenances and/or exchanges of the components may depend on the time of the year, particularly on the season, on the month and/or on another period of the year. In a preferred embodiment of the invention, it is determined, if the number of maintenances and/or exchanges depends of the time of the year.

When the number of maintenances and/or exchanges within the given time interval depends on the time of the year, the determined function (between the operating parameter and the status data) may be time-dependent within the given time interval. In this way, the time-dependency of the number maintenances and/or exchanges of the components may be taken into account for predicting the life expectance of the component of the observed vehicle.

The number of maintenances and/or exchanges may be time-dependent within the given time interval, if at least one number of maintenances and/or exchanges within the given time interval differs from an averaged number of maintenances and/or exchanges more than a given value, e. g. more than 5%.

The slope of each function may be time-dependent within the given time interval, particularly, if the number of maintenances and/or exchanges is time-dependent within the given time interval.

Moreover, if the number of maintenances and/or exchanges is time-dependent within the given time interval, the selected slope may be time-dependent within the given time interval. For example, the selected slope may be different for several periods within the given time interval.

In a preferred embodiment of the invention, reasons, which lead to maintenance and/or exchange of the component of the several vehicles, are analysed in that it is checked, if the reasons depend on the operating parameter. Maintenance(s) and/or exchange(s), which expediently are caused by a reason that is independent from the operating parameter, may be neglected for predicting the life expectancy of the component of the observed vehicle.

Further, it may be determined, if a number of maintenances and/or replacements depends on the operating parameter. When the number of maintenances and/or replacements depends on the operating parameter, this range of the operating parameter with the highest number of maintenances and/or exchanges may be determined.

If the operating parameter of the observed vehicle reaches the determined range (with the highest number of maintenances and/or exchanges), the status of the component of the observed vehicle can be checked.

Further, the number of maintenances and/or exchanges in each range of the operating parameter can be used as a weighting parameter in determining the life expectancy of the component of the observed vehicle.

The status data may be split into training data (particularly for predicting the life expectancy) and test data (particularly to test the prediction).

It is advantageous that a validation of the prediction takes place. By means of the validation, an uncertainty of the prediction may be determined. Preferentially, the uncertainty may be minimised. Hence, the status data may be split into training data, validation data (particularly for the validation of the prediction) and test data.

By predicting the life expectancy of a component, it may be predicted when a maintenance and/or a replacement of the component is/are necessary. Particularly, a mileage, an operating time, an operating number, and/or an operating power, at which a maintenance and/or a replacement of the component is/are necessary, may be predicted. Further, particularly by including a time table of the observed vehicle, a point of time, at which a maintenance and/or a replacement of the component is/are necessary, may be predicted.

The operating parameter may be a number of maintenances. Then, by predicting the life expectancy of a component, it may be predicted when a replacement of the component is necessary. In this case, the life expectancy may depend on the number of maintenances.

Preferably, the component is maintained and/or exchanged at the predicted mileage/operating time/operating number/operating power/point of time. More general, the component may be maintained and/or exchanged when the predicted life expectancy of the component is reached.

In this respect, the invention is related to a method for operating, particularly for maintaining and/or repairing, an observed vehicle—which observed vehicle may be the observed vehicle named above—, wherein the method named above (for predicting the life expectancy of a component of an observed vehicle) or an embodiment thereof is executed.

When the predicted life expectancy of the component is reached, the component is maintained and/or exchanged.

A previous maintenance strategy regarding the point of time, at which the component has been maintained and/or exchanged in the past, may be determined and/or analysed. Preferably, the previous maintenance strategy is compared with a required point of time for maintaining and/or exchanging the component. Moreover, it is advantageous that the maintenance strategy is adapted to the requirement. In this way, the usage of the component can be optimised.

Preferentially, reasons which may lead to maintenance and/or exchange of the component are determined. Moreover, the probability of the reasons may be determined. Further, the most frequent reason can be determined.

The most frequent reason(s) can be decreased and/or eliminated by changing/optimising the component. In this way, the (observed) vehicle may be operated in an enhanced way.

By means of the method (for predicting the life expectancy of a component of an observed vehicle), the life expectancies of several components of the observed vehicle may be predicted in the same way. Moreover, by means of the method, the life expectancies of components of at least some of the several vehicles may be predicted in the same way.

The method named above (for predicting the life expectancy of a component of an observed vehicle) may be used for organising the storage of spare parts, particularly within a workshop/depot. The workshop/depot may be responsible for maintaining and/or repairing the observed vehicle. Moreover, the workshop/depot may be responsible for maintaining and/or repairing the several vehicles.

The life expectancy of the components of the several vehicles may be predicted. Moreover, a number of needed spare parts may be determined on the basis of the predicted life expectancies of the components. In this way, the amount of stored spare parts may be optimised.

For organising the storage of spare parts, a delivery time of the spare part and/or cost of the spare part can be considered.

Moreover, the operating-parameter dependent probability can be used for organising the storage of spare parts, particularly for planning extra spare parts for this range of the operating parameter, where the number of maintenances and/or repairs is maximal.

The invention and/or the described embodiments thereof may be realised—at least partially or completely—in software and/or in hardware, latter e. g. by means of a special electrical circuit.

Further, the invention and/or the described embodiments thereof may be realised—at least partially or completely—by means of a computer readable medium having a computer program, which, when executed on a computer, realises the method according to the invention and/or according to the embodiments thereof.

Further, the invention is related to a processing unit for predicting the life expectancy of a component of an observed vehicle. According to the invention, the processing unit is embodied to execute the steps described above.

Hence, the processing unit is embodied to be fed with status data of selected components of several vehicles. Moreover, the processing unit is embodied to be fed with an operating parameter for each of these selected components of the several vehicles, which operating parameter influences the status data of the respective selected component. Additionally, the processing unit is embodied to determine a function between the operating parameter and the status data for each of the selected components. Further, the processing unit is embodied to select one function, which fits best for the component of the observed vehicle, by means of an algorithm. Further, the processing unit is embodied to be fed with an operating parameter of the component of the observed vehicle. Moreover, the processing unit is embodied to predict the life expectancy of the component of the observed vehicle by means of the selected function and on the basis of the operating parameter of the component of the observed vehicle.

The processing unit according the invention may be the processing unit mentioned above in connection with the method.

Hence, features, which are mentioned in connection with the method, may also refer to this processing unit.

Even if terms are used in the singular or in a specific numeral form, the scope of the invention should not be restricted to the singular or the specific numeral form.

The previously given description of advantageous embodiments of the invention contains numerous features which are partially combined with one another in the dependent claims. Expediently, these features can also be considered individually and be combined with one another into further suitable combinations. More particularly, these features may be combined with the processing unit and the method according to the respective independent claim individually as well as in any suitable combination. Furthermore, features of the method, formulated as apparatus features, may be considered as features of the processing unit and, accordingly, features of the processing unit, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE SEVERAL VIEWS OF THE DRAWING

In the drawings display:
FIGURE a flow diagram of the method for predicting the life expectancy of a component of an observed vehicle.

DESCRIPTION OF THE INVENTION

The FIGURE schematically shows a flow diagram 2 of the method for predicting the life expectancy 24 of a component of an observed vehicle. The method is executed by a processing unit (not shown).

Maintenance data 4 of several vehicles are provided. Exemplarily, the maintenance data 4 on the left side of the drawing are maintenance data 4 of vehicle A and the maintenance data 4 on the right side of the drawing are maintenance data 4 of vehicle B. Further maintenance data of further vehicles may be provided (not shown).

By means of the text analysis 6, particularly by means of text mining, text of the maintenance data 4 is structured. Moreover, by means of the text analysis 6, a keyword dictionary is created and the text of the maintenance data 4 is searched for keywords of the keyword dictionary. Information regarding the respective component (component relevant information) of the text is found. In this way, component relevant information is selected from the maintenance data 4 by means of the text analysis 6. Hence, status data 8 of components of the several vehicles are extracted from the maintenance data 4 by means of text analysis 6, particularly by means of text mining.

The keyword dictionary comprises component relevant entries, particularly in different languages.

The maintenance data 4 comprise several datasets. Datasets regarding the component may be selected, for example in that keywords regarding the component are searched within the datasets. Further, status data 8 may be determined by analysing dataset entries of the datasets regarding the component, particularly by means of the text analysis 6.

The text analysis 6 may be done by means of an analysing unit, which may be part of the processing unit. Hence, the processing unit may be fed with status data 8 indirectly, particularly by feeding the maintenance data 4 comprising the status data 8.

Principally, it may be possible that the analysing unit is separate to the processing unit. In this case, the processing unit may be fed with status data 8 directly, particularly by means of the analysing unit.

Moreover, the maintenance data 4 comprise text, e. g. flow text. The component relevant information is selected from the maintenance data 4 by means of the text analysis 6, particularly by means of the keyword dictionary. Therefore, the text is searched for keywords of the keyword dictionary. Further, by means of the text analysis 6 component relevant information of the text, which may refer to at least one of the keywords, is found.

The status data 8 comprise the status describing information of the text.

Further, an operating parameter 10 of the components of the several vehicles is—if possible—determined on the basis of the maintenance data 4. The maintenance data 4 can be incomplete and/or erroneous. Therefore, driving-related diagnostic data 12 of the several vehicles are provided. Exemplarily, the driving-related diagnostic data 12 on the left side of the drawing are driving-related diagnostic data 12 of the vehicle A and the driving-related diagnostic data 12 on the right side of the drawing are driving-related diagnostic data 12 of the vehicle B.

The operating parameter 10 is determined by means of data merging 14 between the maintenance data 4 and the driving-related diagnostic data 12 of the respective vehicle. The operating parameter 10 can be determined by means of the processing unit. Moreover, the operating parameter 10 can be determined by means of the analysing unit. Hence, the operating parameter 10 can be fed to the processing unit directly or indirectly.

The operating parameter 10 influences the status data 8 of the respective component.

For example, the component may be a wheel and the respective vehicle may be a railway vehicle. In this case, the operating parameter 10 can be a mileage. The status data 8 may report wear of the respective wheel. In this case, the status data 8 may comprise information regarding inspection(s), maintenance(s) and/or exchange(s) of the wheel. Maintenance may be re-profiling of the wheel. Further, the status data 8 may comprise information regarding the status of the wheel, like a dimension, e. g. a diameter, a wheel flange width and/or a wheel flange height, of the wheel.

In another example, the component may be a climate control unit. In this case, the operating parameter 10 may be an operating time. The status data 8 may report wear of the respective climate control unit. In this case, the status data 8 may comprise information regarding inspection(s), maintenance(s) and/or exchange(s) of the climate control unit. The maintenance of the climate control unit may be a change of service fluid and/or a change of an air filter of the climate control unit. Further, the status data 8 may comprise a status of the climate control unit, like a cleanliness factor, e. g. of the service fluid and/or of the air filter.

In a further example, the component may be a brake. In this case, the operating parameter 10 may be an operating time and an operating power, particularly a sum of previously applied operating powers. The status data 8 may report wear of the respective brake. In this case, the status data 8 may comprise information regarding inspection(s), maintenance(s) and/or exchange(s) of the brake or of parts of the brake. The maintenance of the brake may be a change of service fluid like oil.

The operating parameter 10 and the status data 8 are analysed 18 as following, wherein the analysis 18 comprises statistical analysis:

The function 16 between the operating parameter 10 and the status data 8 is determined for each of the selected components, wherein each of the determined functions 16 has a slope 20, particularly an averaged slope 20. The respective function 16 may be a regression, for example a linear regression. The (averaged) slope 20 may be the slope 20 of the respective linear regression.

From the slopes of the determined functions 16, one slope, which fits best for the component of the observed vehicle, is determined. Therefore, a most frequent slope, a(n) (arithmetic) mean slope or a median slope may be determined and may be selected. Hence, a function may be selected, which may have the selected slope.

The processing unit is fed with an operating parameter 22 of the component of the observed vehicle. The operating parameter 22 of the component of the observed vehicle may be determined in the same way as the operating parameters 10 of the (selected) components of the several vehicles.

The life expectancy 24 of the component of the observed vehicle may be predicted by means of the most probable slope. Hence, the life expectancy 24 of the component of the observed vehicle is predicted by means of the most probable function 16. Further, the life expectancy 24 of the component of the observed vehicle is predicted on the basis of the operating parameter 22 of the component of the observed vehicle.

Maintenances and/or exchanges of the (selected) components may be time-dependent, e. g. they may depend on the time of the year. Hence, the time-dependent probability 26 is determined, which time-dependent probability 26 describes a number of maintenances and/or exchanges in dependency of the time of the year. The time-dependent probability may change over the time of the year, if at least one value of the time-dependent probability differs from an averaged time-dependent probability more than a given value, e. g. more than 5% in total.

If the time-dependent probability 26 changes over time of the year, the time-dependent probability 26 may be taken into account for predicting the life expectancy 24 of the component of the observed vehicle. Moreover, if the time-dependent probability 26 changes over the time of the year, the function 16 between the operating parameter 10 and the status data 8 is determined for each of the several times of the year separately.

If the time-dependent probability 26 changes over time of the year, the most probable slope 20 is determined for each of the several times of the year separately. The life expectancy 24 of the component of the observed vehicle may be predicted by means of the most probable slope 20 within each time of the year.

Further, reasons 28, which lead to maintenance and/or exchange of the component of the several vehicles, are analysed in that it is checked, if the reasons 28 depend on the operating parameter 10. Maintenance(s) and/or exchange(s), which are caused by a reason 28 that is independent from the operating parameter 10, are neglected for predicting the life expectancy 24 of the component of the observed vehicle. Therefore, status data 8 referring to reasons 28 that are independent from the operating parameter 10 are neglected.

By means of the analysis 18, an operating-parameter-dependent probability 30 is determined, which describes a number of maintenances and/or replacements in dependency of the operating parameter 10. Moreover, by means of the analysis 18 an operating-parameter-dependent probability 30 is determined, which describes a number of maintenances and/or replacements in dependency of certain ranges of the operating parameter 10.

The operating-parameter-dependent probability 30 can be used as a weighting parameter in determining the life expectancy 24 of the component of the observed vehicle. For example, if the determined life expectancy 24 lies within a range of the operating parameter with a maximal operating-parameter-dependent probability 30, the life expectancy 24 may be lowered by a given value.

Expediently, the component is maintained and/or exchanged, when the predicted life expectancy of the component is reached.

A maintenance strategy when the component has been maintained and/or exchanged in the past may be determined and/or analysed. Preferably, the maintenance strategy when the component has been maintained and/or exchanged in the past is compared with a requirement when the component has to be maintained and/or exchanged. Moreover, it is advantageous that the behaviour is adapted to the requirement. In this way, the usage of the component can be optimised.

For example, the components may have been maintained and/or exchanged in the past more than a given time interval, e. g. more than 2 weeks, earlier as required, particularly in more than a given percentage, e. g. in more than 50%, of the cases. By adapting the behaviour to the requirements, the usage of the component can be optimised, e. g. resources and/or costs can be saved.

For example, the components may have been maintained and/or exchanged in the past more than a given time interval, e. g. more than 2 weeks, later as required, particularly in more than a given percentage, e. g. in more than 50%, of the cases. By adapting the behaviour to the requirements, the usage of the component can be optimised, e. g. the safety of the component—and, hence, of the respective vehicle—can be assured.

While specific embodiments have been described in detail, those with ordinary skill in the art will appreciate that various modifications and alternatives to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any equivalents thereof.

The invention claimed is:

1. A method of predicting a life expectancy of a component of an observed vehicle, the method comprising:
feeding status data of selected components of a plurality of vehicles to a processing unit;
feeding to the processing unit an operating parameter for each of the selected components of the plurality vehicles, the operating parameter influencing the status data of the respective selected component;
determining a function between the operating parameter and the status data for each of the selected components;
selecting one function, which fits best for the component of the observed vehicle, by way of an algorithm;
feeding to the processing unit an operating parameter of the component of the observed vehicle;
predicting the life expectancy of the component of the observed vehicle with the processing unit using the one function and the operating parameter of the component of the observed vehicle;
determining the function between the operating parameter and the status data for each of the selected components, each of the determined functions having a slope;
selecting one slope, which fits best for the component of the observed vehicle, by way of an algorithm, and predicting the life expectancy of the component of the observed vehicle by way of the selected slope; and
at least one of performing maintenance on the component of the observed vehicle or exchanging the component of the observed vehicle based on the life expectancy of the component of the observed vehicle predicted in the predicting step.

2. The method according to claim 1, wherein the operating parameter for each of the selected components of the plurality vehicles is at least one parameter selected from the group consisting of a mileage, an operating time, an operating number, and an operating power.

3. The method according to claim 1, wherein the status data are at least one of current or past status data, and the status data represent wear of the respective component.

4. The method according to claim 1, wherein the status data comprises at least one of information regarding inspection, maintenance, or exchange of the respective component or regarding the status of the respective component.

5. The method according to claim 4, which comprises selecting the information from maintenance data of the respective vehicles by text analysis.

6. The method according to claim 5, which comprises selecting the information from the maintenance data by text mining.

7. The method according to claim 5, wherein the text analysis comprises:
structuring the text of the maintenance data;
creating a keyword dictionary;
searching the text of the maintenance data for keywords of the keyword dictionary; and
finding the information contained in the text.

8. The method according to claim 1, wherein the slope is an average slope.

9. The method according to claim 1, which comprises determining whether or not a number of maintenances or exchanges within a given time interval is time-dependent, and, when the number of maintenances or exchanges within the given time interval is time-dependent, the determined function between the operating parameter and the status data is time-dependent within the given time interval.

10. The method according to claim 1, which comprises, when at least one of a maintenance or exchange are caused by a reason that is independent from the operating parameter, neglecting the at least one of the maintenance or exchange of a component of at least one of the plurality of vehicles for predicting the life expectancy of the component of the observed vehicle.

11. The method according to claim 1, wherein predicting the life expectancy of a component comprises predicting when at least one of a maintenance or a replacement of the component becomes necessary.

12. A method for operating a vehicle, the method comprising:
observing the vehicle and executing the method according to claim 1 for determining and predicting a life expectancy of a component; and
when the predicted life expectancy of the component is reached subjecting the component to at least one of maintenance or exchanging the component.

13. A method for operating an observed vehicle, the method comprising:
executing the method according to claim 1;
comparing a previous maintenance strategy regarding a point of time at which the component was at least one of maintained or exchanged in the past, with a required point of time for at least one of maintaining or exchanging.

14. A method for operating an observed vehicle, the method comprising:
executing the method according to claim 1;
determining reasons which lead to at least one of maintenance or exchange of the component, and a probability thereof, determining a most frequent reason, and decreasing or eliminating the most frequent reason by changing/optimizing the component.

15. A method of predicting a life expectancy of a component of an observed vehicle, the method comprising:
feeding status data of selected components of a plurality of vehicles to a processing unit;
feeding to the processing unit an operating parameter for each of the selected components of the plurality vehicles, the operating parameter influencing the status data of the respective selected component;
determining a function between the operating parameter and the status data for each of the selected components;
selecting one function, which fits best for the component of the observed vehicle, by way of an algorithm;
feeding to the processing unit an operating parameter of the component of the observed vehicle;
predicting the life expectancy of the component of the observed vehicle with the processing unit using the one function and the operating parameter of the component of the observed vehicle;
determining whether at least one of a number of maintenances or replacements depends on the operating parameter;
when the at least one of a number of maintenances or replacements depends on the operating parameter, determining a range of the operating parameter with a highest number of maintenances or exchanges; and
at least one of performing maintenance on the component of the observed vehicle or exchanging the component of the observed vehicle based on the life expectancy of the component of the observed vehicle predicted in the predicting step.

* * * * *